United States Patent
Moon

(10) Patent No.: US 7,130,669 B2
(45) Date of Patent: Oct. 31, 2006

(54) PORTABLE INFORMATION TERMINAL HAVING EXPANDABLE DATA INPUT UNIT

(75) Inventor: Byoung-Seoup Moon, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 475 days.

(21) Appl. No.: 10/316,422

(22) Filed: Dec. 11, 2002

(65) Prior Publication Data

US 2004/0204197 A1   Oct. 14, 2004

(30) Foreign Application Priority Data

Sep. 4, 2002  (KR) .................. 10-2002-0053177

(51) Int. Cl.
*H04Q 7/20* (2006.01)
(52) U.S. Cl. .................. 455/575.3; 455/575.1; 455/90.3
(58) Field of Classification Search ............. 455/90.3, 455/575.1, 575.2, 575.3, 66.1, 556.1, 556.2, 455/557; 345/168, 169; 379/428.01; 341/20, 341/22, 23
See application file for complete search history.

(56) References Cited

U.S. PATENT DOCUMENTS

| | | | |
|---|---|---|---|
| 6,047,196 A * | 4/2000 | Makela et al. | 455/556.1 |
| 6,249,684 B1* | 6/2001 | Hasegawa | 455/575.3 |
| 6,661,404 B1* | 12/2003 | Sirola et al. | 345/168 |
| 6,876,876 B1* | 4/2005 | Uhlemann | 455/575.3 |
| 2002/0006815 A1* | 1/2002 | Finke-Anlauff | 455/575 |
| 2002/0119685 A1* | 8/2002 | Gardenfors et al. | 439/86 |
| 2003/0003878 A1* | 1/2003 | Bestle | 455/90 |
| 2004/0203513 A1* | 10/2004 | Kwon | 455/90.3 |
| 2005/0017953 A1* | 1/2005 | Pekka | 345/169 |

* cited by examiner

Primary Examiner—Jean Gelin
(74) Attorney, Agent, or Firm—Dilworth & Barrese LLP

(57) ABSTRACT

A portable information terminal for inputting complicated data is disclosed. The portable terminal comprises a main housing having first and second top surfaces formed in a step form; a data input housing disposed on the main housing in a foldable manner and having top and bottom surfaces; and a hinge for joining the data input housing to the main housing in a rotatable manner. The second top surface of the main housing has a first plurality of keys, the top surface of the data input housing has a second plurality of keys, and the bottom surface of the data input housing has a third plurality of keys.

4 Claims, 6 Drawing Sheets

PORTABLE INFORMATION TERMINAL HAVING EXPANDABLE DATA INPUT UNIT

PRIORITY

This application claims priority to an application entitled "Potable Information Terminal Having Expandable Data Input Unit" filed in the Korean Industrial Property Office on Sep. 4, 2002 and assigned Serial No. 2002-53177, the contents of which are hereby incorporated by reference.

BACKGROUND OF THE INVENTION

1. Field of the Invention

The present invention relates to a portable information terminal, and more particularly to a portable information terminal for inputting complicated data in an easy convenient manner.

2. Description of the Related Art

In general, "a portable information terminal" refers to a device which a user can carry with him/her to perform wireless communication with a corresponding communication partner. This portable communication device is classified into various types based on its geometry. For example, a wireless terminal is classified into a bar-type, a flip-type or folder-type in accordance with its geometrical appearance. The bar-type wireless terminal is generally constructed as a single housing having a bar shape. The flip-type or folder type wireless terminal typically has a folder that is pivotably coupled to a single bar-shaped housing by a hinge device to make the folder to be foldable. This configuration of aforementioned bar-type, flip-type or folder-type wireless terminal may easily be understood by those skilled in the art.

Furthermore, the portable wireless terminal may be classified into a neck wearable type or a wrist wearable type based on a use position or the way in which a user puts it on. The neck wearable type wireless terminal is worn around the neck using a string, while the wrist wearable type wireless terminal is worn around the wrist.

Furthermore, the wireless terminal may be classified into a rotation-type or a sliding-type based on an opened and closed way thereof. In the rotation-type wireless terminal, two housings are coupled to each other in a manner in which one housing is capable of being rotatably opened or closed with respect to the other. In the sliding-type wireless terminal, two housings are coupled to each other in a manner in which one housing is capable of being slidably opened or closed with respect to the other through a sliding movement. These foregoing various classified wireless terminals are easily understood by those skilled in the art.

Meanwhile, the aforementioned conventional portable wireless terminals are typically provided with a data input/output unit, respectively. A data input unit typically employs a key pad through which data are input by pressing the key pad. This may also be true for a touch pad or a touch screen. Moreover, a data output unit generally makes use of a Liquid Crystal Display (LCD) for outputting data.

Typically, the key pad used to input data combines a plurality of keys. These keys include numeric keys, character keys, sending keys, end key, functional keys, and the like. In addition, the keys are generally held in place on a top surface of the housing of the portable wireless terminal, and the number of keys is from 15 to 20. The keys are exposed on the top surface the portable wireless terminal so that a user can push them with his/her finger to input desired data.

However, the reality is that users have increasingly higher demands for information and that it is very inconvenient for users to input complicated data using the foregoing number of keys, within the Internet or multimedia environment. The conventional portable wireless terminal has shown a tendency not only to become smaller and lighter but also to reduce dimensions of the housing. This tendency places restrictions on the number of keys that can be set on the terminal. To solve this problem, a voice recognition device or a separate data input unit has been used.

In other cases, the number of keys are increased to allow inputting of complicated data. This increase in the number of keys, however, tends to increase the dimensions of the housing of the conventional portable wireless terminal. Therefore, a problem arises in that the portability of a conventional portable wireless terminal is compromised.

SUMMARY OF THE INVENTION

Accordingly, the present invention has been made to solve the above-mentioned problems occurring in the prior art, and an object of the present invention is to provide a portable information terminal having an expandable data input unit, in which a greater number of keys is provided without increasing the dimensions of the housing in comparison with those of the prior art, and thereby having the capability of inputting complicated data easily as well as maintaining portability.

It is another object that the present invention to provide a portable information terminal having an expandable data input unit which can be adapted for a multimedia environment.

In order to accomplish these objects, according to one embodiment of the present invention, there is provided a portable information terminal comprising: a main housing having first and second top surfaces formed in a step form, the second top surface being formed lower than the first top surface; a data input housing disposed on the main housing in a foldable manner and having top and bottom surfaces formed parallel to each other in a flat form; a hinge for joining the data input housing to the main housing in a rotatable manner; and an input/output unit having a liquid crystal display mounted on the main housing, a first key pad provided on the second top surface of the main housing and having a first plurality of keys, a second key pad provided on the top surface of the data input housing and having a second plurality of keys, and a third key pad provided on the bottom surface of the data input housing having a third plurality of keys. In one aspect, the keys of the second key pad are simpler than the keys of the first key pad and the keys of the third key pad.

Further, according to another embodiment of the present invention, there is provided a portable information terminal comprising: a main housing having first and second top surfaces formed in a step form, the second top surface being formed lower than the first top surface; a folder disposed on the main housing in a foldable manner; a first hinge for joining the folder to the main housing in a rotatable manner so as to open or close the folder relative to the main housing and having an axis formed in a transverse direction relative to the main housing; first and second data input auxiliary housings disposed on the main housing in a foldable manner, respectively, each of data input auxiliary housings having top and bottom surfaces formed parallel to each other in a flat form; second and third hinges for joining the first and second data input auxiliary housings to the main housing in a rotatable manner so as to open or close the data input housings relative to the main housing and having axes formed in a longitudinal direction relative to the main housing; and an input/output unit having a liquid crystal display mounted on the folder, a first key pad provided on the first top surface of the main housing having a first plurality of keys, a second key pad provided on the second top surface of the main housing and having a second plurality of keys, a third key pad provided on the top surface of the first data input auxiliary housing and having a third plurality of keys, a fourth key pad provided on the bottom surface of the first data input auxiliary housing and having a fourth plurality of keys, a fifth key pad provided on the top surface of the second data input auxiliary housing and having a fifth plurality of keys, and a sixth key pad provided on the bottom surface of the second data input auxiliary housing and having a sixth plurality of keys.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, various embodiments of the present invention will be described in detail with reference to the accompanying drawings. In the following description of the present invention, a detailed description of known functions and configurations incorporated herein will be omitted when it may make the subject matter of the present invention rather unclear.

Figure 1:
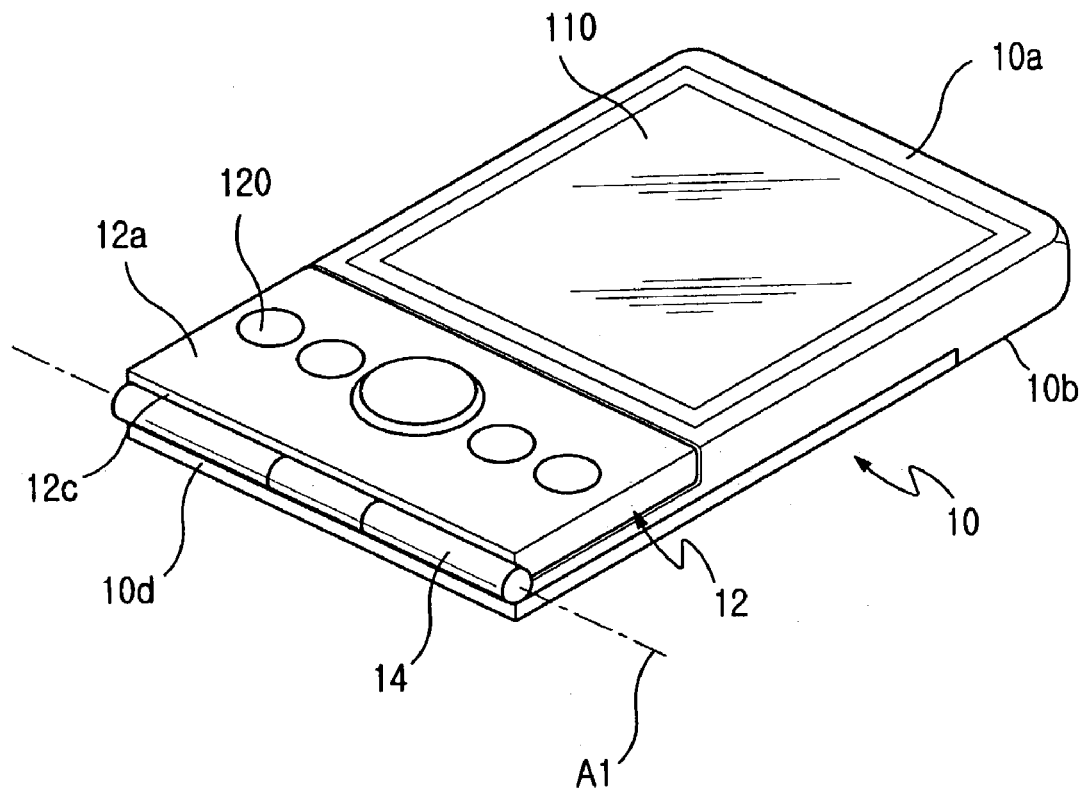
FIG. 1 is a perspective view of a portable information terminal with a data input housing closed with respect to a main housing according to a first embodiment of the present invention.
Figure 2:
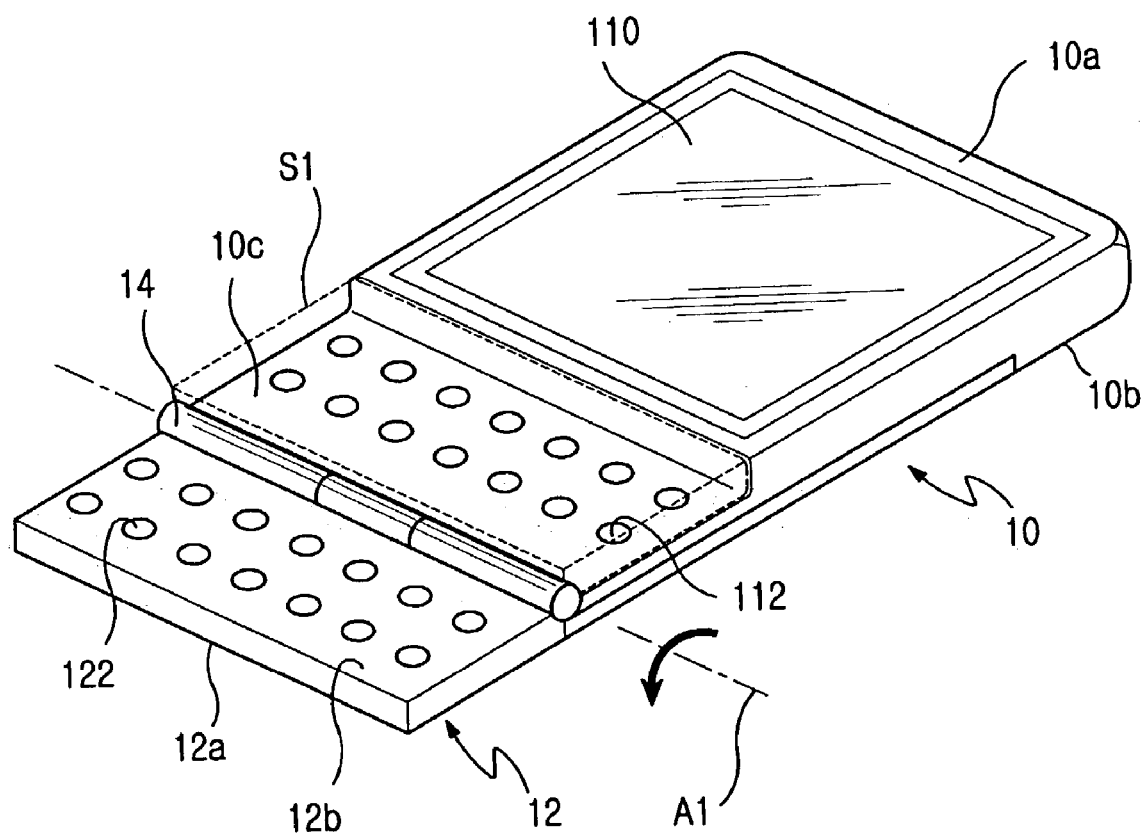
FIG. 2 is a perspective view in which the data input housing and main housing shown in FIG. 1 are opened to each other completely.
Figure 3:
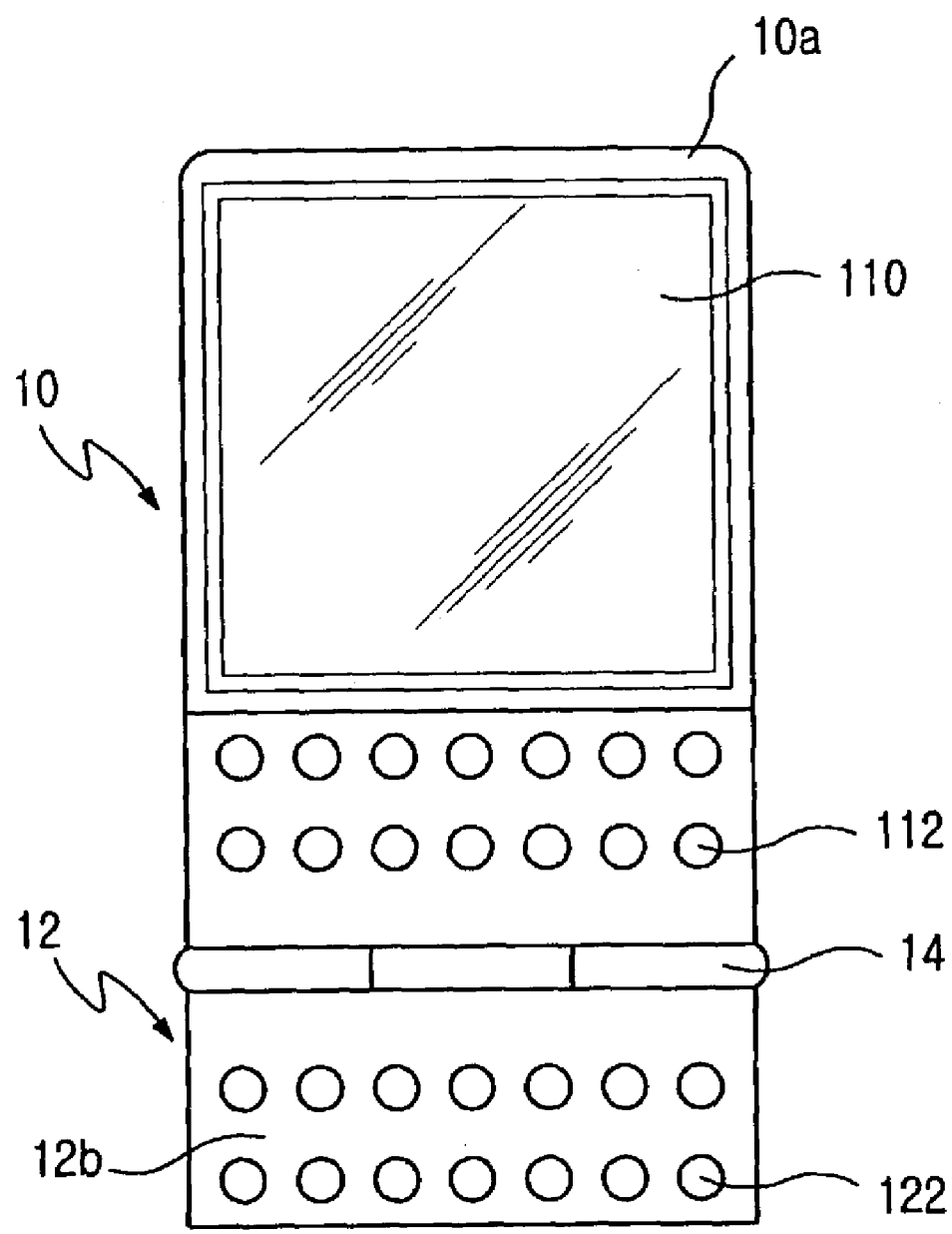
FIG. 3 is a top plan view of the data input housing and main housing shown FIG. 2.

As shown in FIGS. 1 to 3, a portable information terminal according to a first embodiment of the present invention comprises a main housing 10, a data input housing 12 disposed on the main housing 10 in a foldable manner, and a hinge 14 for joining the data input housing 12 to the main housing 10 in a pivotable manner. Specifically, the main housing 10 includes a top surface in a step form and a bottom surface 10b in a plane form. The top surface of the main housing 10 is divided into a first top surface 10a having a Liquid Crystal Display (LCD) 110, a second top surface 10c having a first key pad 112. The first key pad 112 is provided with a first plurality of keys which are aligned with each other. The main housing 10 takes a step form with the second top surface 10c formed lower than the second top surface 10a at a given depth.

The data input housing 12 takes a flat form, having a top surface 12a and a bottom surface 12b. The top surface 12a of the data input housing 12 is provided with a second key pad 120 having a second plurality of keys. The bottom surface 12b of the data input housing 12 is provided with a third key pad 122 having a third plurality of keys. The keys of the second key pad 120 are fewer in comparison with the keys of the first key pad 112 and in comparison with the keys of the third key pad 122.

When the data input housing 12 is positioned on the second top surface 10c, that is to say closed relative to the main housing 10, the first key pad 112 and the third key pad 122 are hidden from view and in a position opposite to each other, while the second key pad 120 is revealed. However, when the data input housing 12 is opened relative to the main housing 10, the first key pad 112 and the third key pad 122 are revealed to a user.

The hinge 14 acts to join the data input housing 12 to the main housing 10 in a pivotable manner, being formed between a front end 10d of the main housing 10 and a rear end 12c of the data input housing 12. Furthermore, the hinge 14 allows the data input housing 12 to be opened up to the angle of 180° so that the second top surface 10c of the main housing 10 can be positioned in flush with the bottom surface 12b.

The first and third key pads 112 and 122 comprise various keys in combination with various kinds of keys, such as character keys, numeric keys, function keys and the like, while the second key pad 120 comprises various keys, simpler than those of the first or third key pad in combination with an application select key, a menu key and the like.

Alternatively, the LCD 110 may be replaced with a touch screen. When a touch screen is employed instead of the LCD 110, an existing stylus (not shown) may be used together.

Usually, the portable information terminal is used with the data input housing 12 closed (see FIG. 1). When the portable information terminal is needed to input the more complicated data, the portable information terminal is used under a condition in which the data input housing 12 is opened completely (see FIG. 2).

Figure 4:
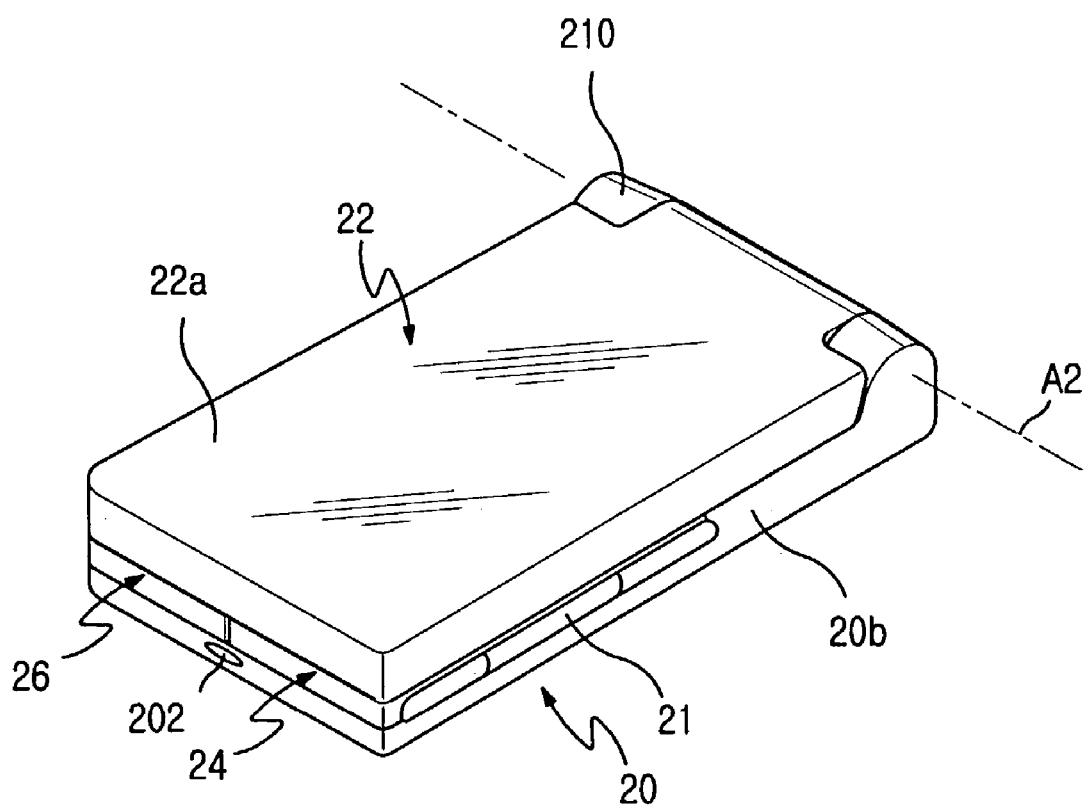
FIG. 4 is a perspective view of a portable information terminal with a folder closed according to a second embodiment of the present invention.
Figure 5:
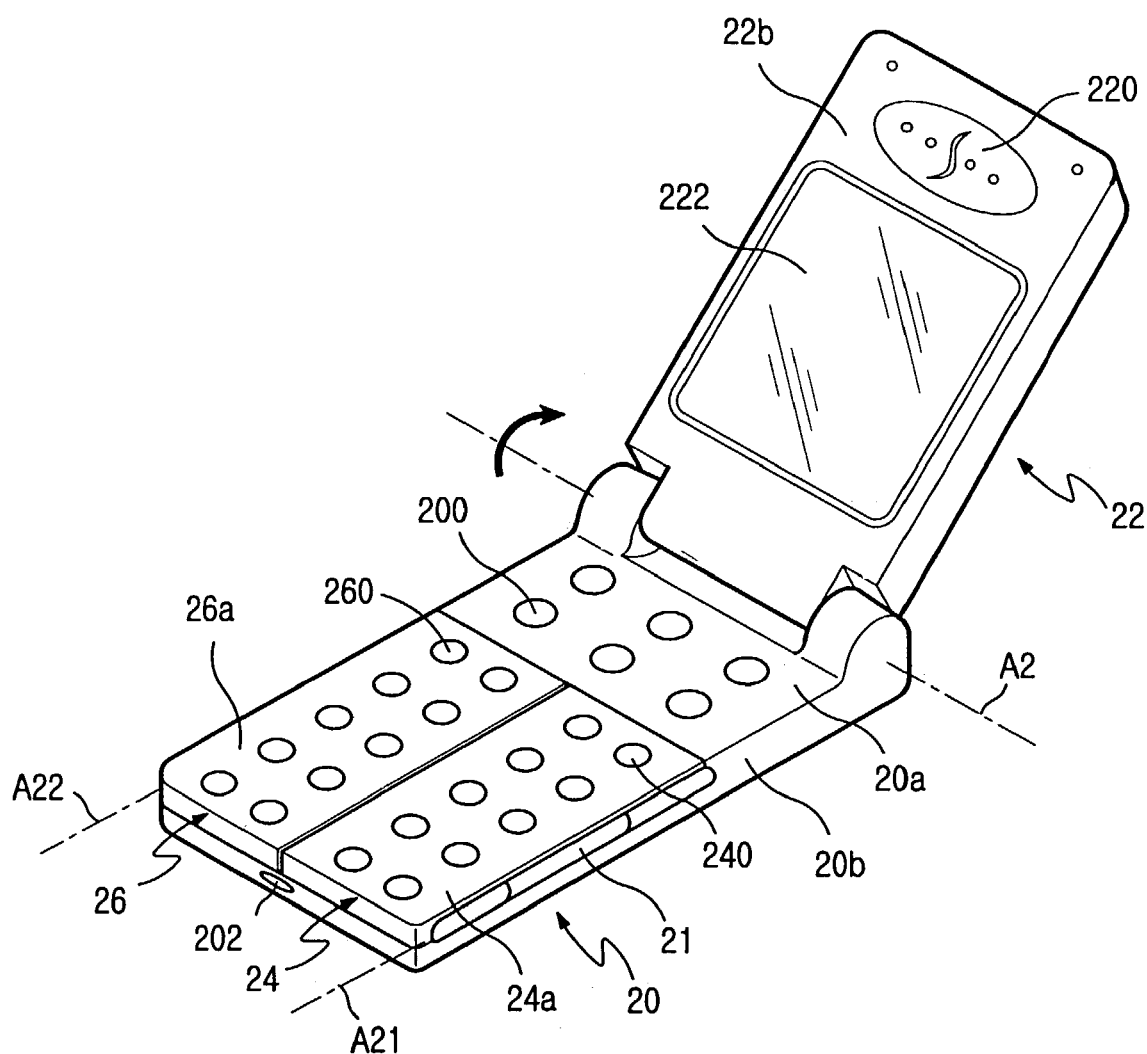
FIG. 5 is a perspective view of the portable information terminal shown in FIG. 4, in which the folder is opened completely.
Figure 6:
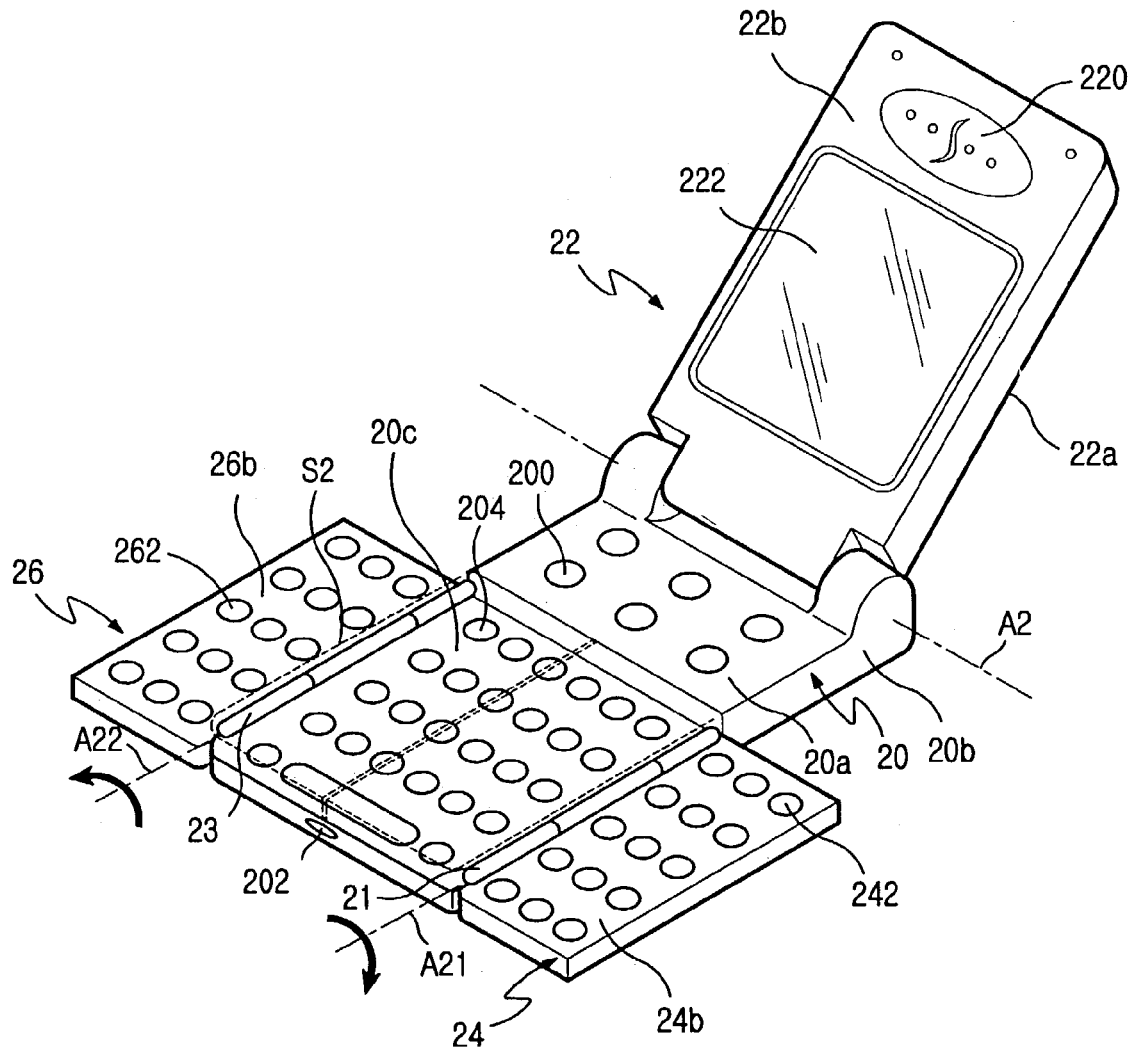
FIG. 6 is a perspective view of the portable information terminal shown in FIG. 5, in which first and second data input auxiliary housings are opened completely.

The construction of the portable information terminal according to a second embodiment of the present invention will be described with reference to FIGS. 4 to 6. FIGS. 4 to 6 illustrates an example of a folder-type portable information terminal. This portable information terminal comprises a main housing 20, a folder 22 disposed on the main housing in a foldable manner, a first hinge 210 for joining the folder 22 to the main housing 20 in a pivotable manner so as to open or close the folder 22 relative to the main housing 20, first and second data input auxiliary housings 24 and 26 disposed on the main housing 20 in a foldable manner, and second and third hinges 21 and 23 for joining the first and second data input auxiliary housings 24 and 26 to the main housing 20 in a pivotable manner so as to open or close the housings 24 and 26 relative to the main housing 20. The second and third hinges 21 and 23 have an identical structure in which they are symmetrical to each other and spaced apart by a given distance. An axis A21 of the second hinge 21 is perpendicular to an axis A2 of the first hinge. An axis A22 of the third hinge 23 is also perpendicular to an axis A2 of the first hinge, being parallel to and spaced apart from the axis A21 of the second hinge 21.

The main housing 20 includes a first top surface 20a, a second top surface 20c formed lower than the first top surface 20a at a given depth, and a side surface 20b. The first and second data input auxiliary housings 24 and 26 are positioned on the second top surface 20c when the housings 24 and 26 are closed relative to the main housing 20. The first top surface 20a is arranged with a first key pad 200 having a first plurality of keys, while the second top surface 20c is arranged with a second key pad 204 having a second plurality of keys. A connection jack 202 into which a plug of a microphone is removably inserted is provided on the lower end of the main housing 20.

The folder 22 has a top surface 22a and a bottom surface 22b, of which the bottom surface 22b is provided with a speaker 220 and a display 222. The display 222 may employ an existing LCD.

The first data input auxiliary housing 24 has a top surface 24a and a bottom surface 24b, of which the top surface 24a is arranged with a third key pad 240 having a third plurality of keys, and the bottom surface 24b is arranged with a fourth key pad 242 having a fourth plurality of keys.

The second data input auxiliary housing 26 has a top surface 26a and a bottom surface 26b, of which the top surface 26a is arranged with a fifth key pad 260 having a fifth plurality of keys, and the bottom surface 26b is arranged with a sixth key pad 262 having a sixth plurality of keys.

As shown in FIG. 5, when the first and second data input auxiliary housings 24 and 26 are closed, the first key pad 200 is exposed toward a user together with the third and fifth key pads 240 and 260, while the second key pad 204 is in a maximal close proximity to or in contact with the fourth and sixth key pads 242 and 262. Moreover, the first and second data input auxiliary housings 24 and 26 rest on the second top surface 20c of the main housing 20. Each of the first and second data input auxiliary housings 24 and 26 has a thickness basically identical to that between the first and second top surfaces 20a and 20c of the main housing 20.

As shown in FIG. 6, when the first and second data input auxiliary housings 24 and 26 are opened, the first and second key pads 200 and 204 are exposed to a user together with the fourth and sixth key pads 242 and 262, thus enabling the use of all these key pads. The second top surface 20c of the main housing 20 is flush with each of the bottom surfaces 24b and 26b of the first and second data input auxiliary housings 24 and 26. For example, FIG. 5 illustrates operation in a normal phone operation mode, and FIG. 6 illustrates operation in a Personal Digital Assistant (PDA) operation mode.

While the invention has been shown and described with reference to various embodiments thereof, it will be understood by one skilled in the art that various modifications may be made therein without departing from the spirit and scope of the invention as defined by the appended claims.

As seen from the foregoing, the present invention allows more keys to be mounted on the housings without increasing the dimensions of entire housings in, comparison to the existing housings, so that any user can conveniently input complicated data as well as continue to enjoy the device's portability.

What is claimed is:

1. A portable information terminal, comprising;
   a main housing having first and second top surfaces formed in a step form, the second top surface being formed lower than the first top surface;
   a folder disposed on the main housing in a foldable manner,
   a first hinge for joining the folder to the main housing in a rotatable manner so as to open or close the folder relative to the main housing and having an axis formed in a transverse direction relative to the main housing;
   first and second data input auxiliary housings disposed on the main housing in a foldable manner, respectively, each of the first and second data input auxiliary housings having top and bottom surfaces formed parallel to each other in a flat form;
   second and third hinges for joining the first and second data input auxiliary housings to the main housing in a rotatable manner so as to open or close the first and second data input auxiliary housings relative to the main housing and having axes formed in a longitudinal direction relative to the main housing; and
   an input/output unit having a liquid crystal display mounted on the folder, a first key pad provided on the first top surface of the main housing and having a first plurality of keys, a second key pad provided on the second top surface of the main housing and having a second plurality of keys, a third key pad provided on the top surface of the first data input auxiliary housing and having a third plurality of keys, a fourth key pad provided on the bottom surface of the first data input auxiliary housing and having a fourth plurality of keys, a fifth key pad provided on the top surface of the second data input auxiliary housing and having a fifth plurality of keys, and a sixth key pad provided on the bottom surface of the second data input auxiliary housing and having a sixth plurality of keys.

2. The portable information terminal according to claim 1, wherein the first and second data input auxiliary housings rest on the second top surface of the main housing when the first and second data input auxiliary housings are closed.

3. The portable information terminal according to claim 1, wherein the axes of the second and third hinge are parallel to and spaced apart each other, each being perpendicular to the axis of the first hinge.

4. The portable information terminal according to claim 1, wherein each of the first and second data input auxiliary housings is designed to rotate up to approximately an angle of 180°.

* * * * *